United States Patent
Ogata et al.

(10) Patent No.: US 11,733,069 B2
(45) Date of Patent: Aug. 22, 2023

(54) POSITION TRANSDUCER AND METHOD FOR MANUFACTURING THE SAME COMPRISING A PAIR OF PHOTODIODES SURROUND THE ENTIRETY OF A PREDETERMINED REGION AND HAVE AN ANNULAR SHAPE

(71) Applicants: Citizen Chiba Precision Co., Ltd., Chiba (JP); CITIZEN WATCH CO., LTD., Tokyo (JP)

(72) Inventors: Kazunari Ogata, Chiba (JP); Shougo Kimura, Chiba (JP); Kaori Funatsu, Chiba (JP)

(73) Assignees: CITIZEN CHIBA PRECISION CO., LTD., Chiba (JP); CITIZEN WATCH CO., LTD., Tokyo (JP)

( * ) Notice: Subject to any disclaimer, the term of this patent is extended or adjusted under 35 U.S.C. 154(b) by 0 days.

(21) Appl. No.: 17/796,178

(22) PCT Filed: Mar. 9, 2021

(86) PCT No.: PCT/JP2021/009309
§ 371 (c)(1),
(2) Date: Jul. 28, 2022

(87) PCT Pub. No.: WO2021/182471
PCT Pub. Date: Sep. 16, 2021

(65) Prior Publication Data
US 2023/0081307 A1 Mar. 16, 2023

(30) Foreign Application Priority Data
Mar. 12, 2020 (JP) ................. 2020-043179

(51) Int. Cl.
*H02K 11/21* (2016.01)
*G01D 5/28* (2006.01)
*G01D 5/30* (2006.01)

(52) U.S. Cl.
CPC ............ *G01D 5/285* (2013.01); *G01D 5/30* (2013.01)

(58) Field of Classification Search
CPC . G01D 5/34; G01D 5/30; H02K 11/21; H02K 11/22
(Continued)

(56) References Cited

U.S. PATENT DOCUMENTS

| 5,235,180 A | 8/1993 | Montagu |
|---|---|---|
| 6,218,803 B1 | 4/2001 | Montagu |

(Continued)

FOREIGN PATENT DOCUMENTS

| CN | 1297526 A | 5/2001 |
|---|---|---|
| JP | 2006-135309 A | 5/2006 |

(Continued)

OTHER PUBLICATIONS

WIPO, International Search Report for PCT/JP2021/009309, dated Apr. 27, 2021.

(Continued)

*Primary Examiner* — Que Tan Le

(57) ABSTRACT

The range of operating angles of a position transducer is widened, and its signal-to-noise ratio is improved. The position transducer includes a light source and a detector including at least one pair of photodiodes (PDs) disposed on a predetermined circle. The detector receives light emitted from the light source to output a signal varying depending on the areas of regions where the light is received on two PDs forming a pair. The PDs are formed on separate chips, respectively, and the chips are disposed on a substrate so that (Continued)

one or more pairs of PDs surround the entirety of a predetermined region and have an annular shape as a whole.

8 Claims, 6 Drawing Sheets

(58) Field of Classification Search
USPC .................................. 250/239, 221, 214.1
See application file for complete search history.

(56) References Cited

U.S. PATENT DOCUMENTS

| | | | |
|---|---|---|---|
| 6,858,830 B2* | 2/2005 | Suzuki | G02B 6/4292 250/214 AG |
| 7,688,432 B1 | 3/2010 | Benner, Jr. | |
| 2007/0148803 A1 | 6/2007 | Yakushiji et al. | |
| 2015/0153204 A1 | 6/2015 | Sato et al. | |
| 2019/0271574 A1 | 9/2019 | Benner, Jr. et al. | |

FOREIGN PATENT DOCUMENTS

| | | |
|---|---|---|
| JP | 2009-542178 A | 11/2009 |
| JP | 2014-102244 A | 6/2014 |
| JP | 2017-181473 A | 10/2017 |
| JP | 2017-181474 A | 10/2017 |
| JP | 2017-181475 A | 10/2017 |
| WO | 99/54688 A1 | 10/1999 |
| WO | 2008/054879 A1 | 5/2008 |

OTHER PUBLICATIONS

WIPO, Written Opinion for PCT/JP2021/009309, dated Apr. 27, 2021.

China National Intellectual Property Administration, Office Action for Chinese Patent Application No. 202180012503.9, dated Jan. 10, 2023.

* cited by examiner (a)

(b)

POSITION TRANSDUCER AND METHOD FOR MANUFACTURING THE SAME COMPRISING A PAIR OF PHOTODIODES SURROUND THE ENTIRETY OF A PREDETERMINED REGION AND HAVE AN ANNULAR SHAPE

FIELD

The present invention relates to a position transducer and a method for manufacturing the same.

BACKGROUND

Position transducers to be mounted on a limited rotation motor that drives an optical component for scanning laser light, such as a mirror, are known. For example, Patent Document 1 discloses a position transducer system for a limited rotation motor. The position transducer system includes an illumination source that directs illumination toward an illumination reflector that rotates with a rotor of the limited rotation motor, and a plurality of detector areas, adjacent to the illumination source, for receiving modulated reflected illumination from the illumination reflector. In the position transducer system, the detector areas are formed of a single monolithic detector, and the illumination source is mounted in an inactive area on the detector.

Patent Documents 2 to 5 each disclose a position transducer that includes a reflector mounted on a rotating shaft of a limited rotation motor and having reflective surfaces projecting radially from the rotating shaft, a diffused light source mounted on a circuit board so as to face the reflective surfaces, and a diffused-light absorbing member behind the reflector as seen from the diffused light source. The diffused-light absorbing member is formed on a fixed side of the limited rotation motor so as to surround the reflector at a distance therefrom and absorbs light radiating from the diffused light source and projected on none of the reflective surfaces. The position transducer further includes a detector including pairs of photodiodes mounted on a circle centered at a position on the circuit board immediately above the rotating shaft. The detector receives an image of light reflected by the rotating reflective surfaces to output a signal varying depending on the areas of the received image on two photodiodes forming a pair.

CITATION LIST

Patent Documents

Patent Document 1: Japanese Unexamined Patent Publication No. 2009-542178
Patent Document 2: Japanese Unexamined Patent Publication No. 2014-102244
Patent Document 3: Japanese Unexamined Patent Publication No. 2017-181473
Patent Document 4: Japanese Unexamined Patent Publication No. 2017-181474
Patent Document 5: Japanese Unexamined Patent Publication No. 2017-181475

SUMMARY

In any of the position transducers described in Patent Documents 2 to 5, the photodiodes, which constitute the detector, do not surround the entirety of the diffused light source on the circuit board, and the circle of the photodiodes breaks at two arcuate portions facing each other with the diffused light source therebetween (see regions 6c in FIG. 4 described below). Since the broken portions of the circle of the photodiodes cannot receive reflected light from the reflector, which rotates in forward and backward directions within a limited range of angles centered at a reference position, the range of operating angles of the reflector (thus, of the position transducer) is limited depending on the length of sections where the photodiodes are disposed.

In the position transducer system of Patent Document 1, although the detector areas surround the entirety of the illumination source, the whole detector is formed of a single wafer, which requires the illumination source to be mounted on the detector rather than on the circuit board. This decreases the signal-to-noise ratio of output because light from the illumination source is more likely to enter the detector directly than would be the case if the illumination source were mounted on the circuit board. In the position transducer system, it is not practical to form an opening to provide a mounting region for the illumination source at the center of the wafer of the detector because it increases processing cost.

It is an object of the present invention to widen the range of operating angles of a position transducer and improve its signal-to-noise ratio.

A position transducer including a light source and a detector is provided. The detector includes at least one pair of photodiodes disposed on a predetermined circle and receives light emitted from the light source to output a signal varying depending on the areas of regions where the light is received on two photodiodes forming a pair. The photodiodes are formed on separate chips, respectively, and the chips are disposed on a substrate so that one or more pairs of photodiodes surround the entirety of a predetermined region and have an annular shape as a whole.

The photodiodes and the chips are preferably disposed on the substrate with 360/n degree rotational symmetry, wherein n represents the number of photodiodes. The at least one pair of photodiodes preferably includes two pairs of photodiodes. The chips are preferably polygons. The chips are preferably pentagons, and further disposed so as to have a tetragonal outline as a whole. The chips are preferably hexagons, and further disposed so as to have an octagonal outline as a whole.

A method for manufacturing a position transducer including a light source and a detector is provided. The detector includes at least one pair of photodiodes disposed on a predetermined circle and receives light emitted from the light source to output a signal varying depending on the areas of regions where the light is received on two photodiodes forming a pair. The photodiodes are formed on separate chips, respectively, and the chips are disposed on a substrate so that one or more pairs of photodiodes surround the entirety of a predetermined region and have an annular shape as a whole. The method includes the steps of: forming partially annular photodiodes on a common wafer in a grid-like pattern so that adjacent photodiodes face in 180 degree opposite directions; forming chips by cutting the wafer longitudinally, latitudinally, and obliquely; and disposing the chips on a substrate so that the photodiodes have an annular shape as a whole.

The above position transducer has a wider range of operating angles and a better signal-to-noise ratio than could be achieved without the configuration of the present invention.

DESCRIPTION OF EMBODIMENTS

Hereinafter, a position transducer will be explained in detail with reference to the drawings. However, note that the present invention is not limited to the drawings or the embodiment described below.

Figure 1A:
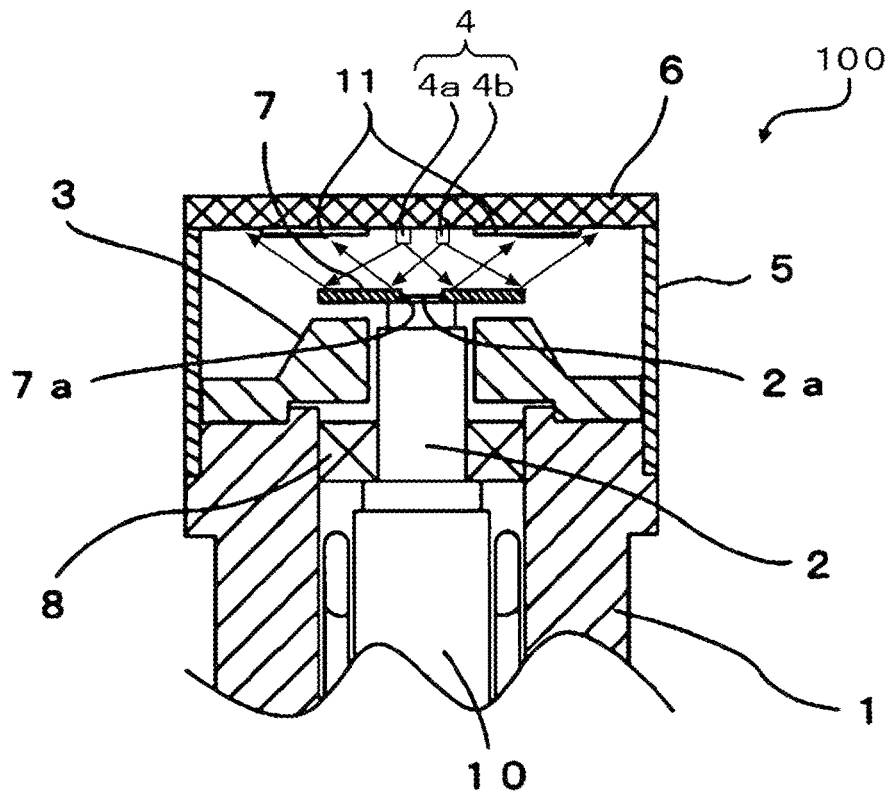
FIG. 1A is a longitudinal sectional view of a position transducer 100.
Figure 1B:
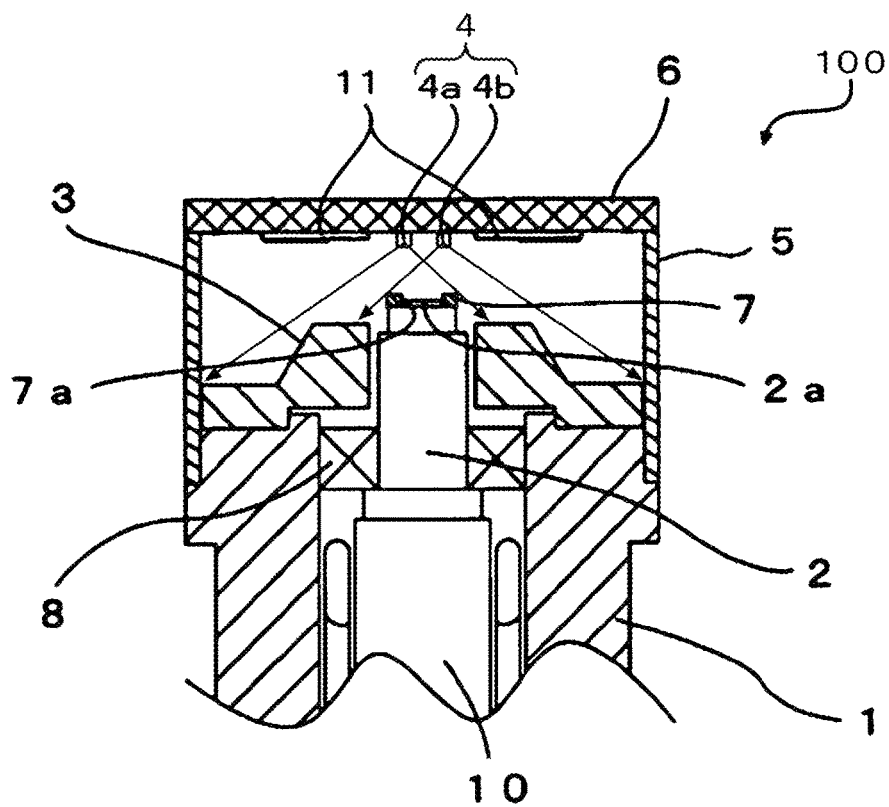
FIG. 1B is a longitudinal sectional view of the position transducer 100 with the viewing direction rotated 90 degrees sideways from that in FIG. 1A.
Figure 1C:
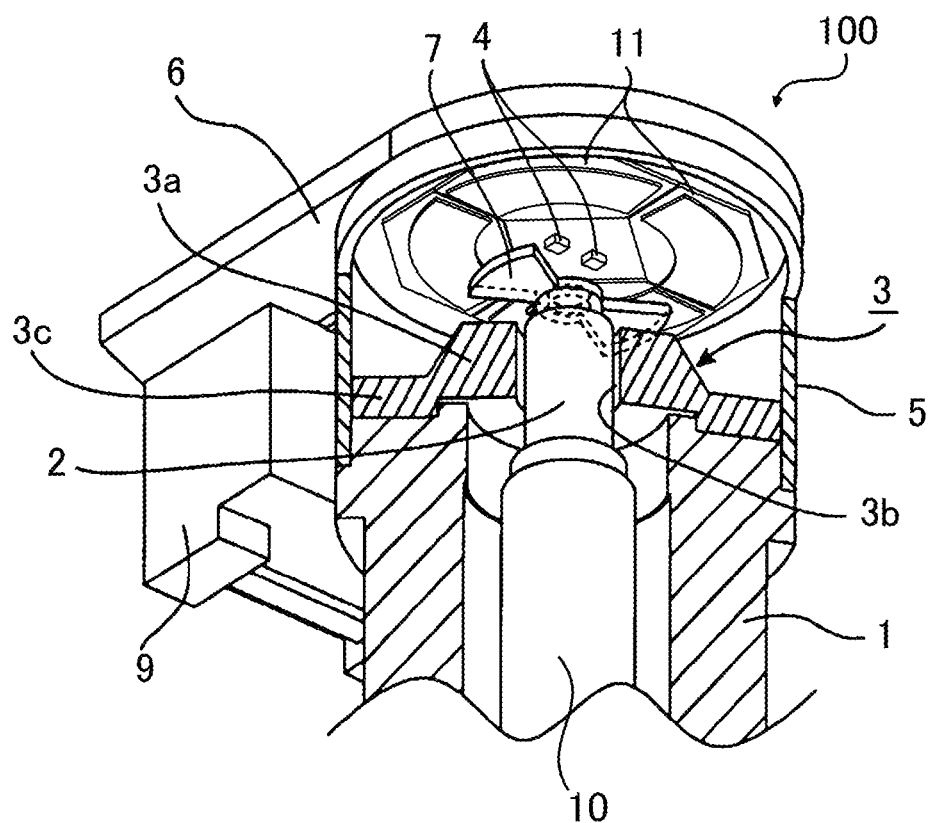
FIG. 1C is a perspective view of the position transducer 100 partially cut away.

FIG. 1A is a longitudinal sectional view of a position transducer 100. FIG. 1B is a longitudinal sectional view of the position transducer 100 with the viewing direction rotated 90 degrees sideways from that in FIG. 1A. FIG. 1C is a perspective view of the position transducer 100 partially cut away. FIG. 1C does not show a bearing 8.

The position transducer 100 is composed of a limited rotation motor 1, a diffused light absorber 3, LED dies 4, a case 5, a printed circuit board 6, a reflector 7, a detector 11, and other components. The position transducer 100 is a reflection-type optical position transducer that detects with the detector 11 light emitted from the LED dies 4 and reflected by the reflector 7 to detect the rotation angle of the limited rotation motor 1.

The limited rotation motor 1 includes a rotating shaft 2 at an edge of a rotor 10, and the rotating shaft 2 is supported by the bearing 8. At an end of the rotating shaft 2 projects a reflector mounting portion 2a, on which the reflector 7 is mounted. The reflector 7 rotates in forward and backward directions within a limited range of angles centered at a reference position, together with the rotating shaft 2 by drive of the limited rotation motor 1.

At the top of the limited rotation motor 1, the diffused light absorber 3 is disposed away from the reflector 7. As shown in FIG. 1C, the diffused light absorber 3 has a disc-shaped portion 3c, a trapezoidal portion 3a formed around the middle of the disc-shaped portion 3c, and a through-hole 3b formed in the middle of the trapezoidal portion 3a. The diffused light absorber 3 is mounted on the upper end of the limited rotation motor 1 with the rotating shaft 2 inserted into the through-hole 3b, and is embedded in the cylindrical case 5.

The diffused light absorber 3 and the case 5 are fixed-side members that are not rotated by the limited rotation motor 1. On the surfaces of the fixed-side diffused light absorber 3 and case 5 away from the reflective surfaces of the reflector 7 is disposed a diffused-light absorbing member 3d (see FIG. 2), which absorbs light from the LED dies 4. More specifically, the internal space formed by the diffused light absorber 3 and the case 5 is surrounded by the diffused-light absorbing member 3d. The diffused light absorber 3 and the case 5 absorb with the diffused-light absorbing member 3d light emitted from the LED dies 4 and not projected on the reflector 7.

Figure 2:
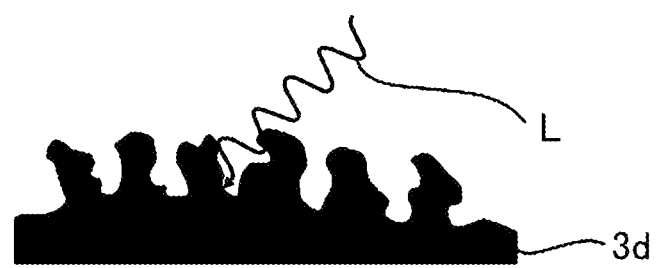
FIG. 2 is an enlarged view of the surface of a diffused-light absorbing member 3d.

FIG. 2 is an enlarged view of the surface of the diffused-light absorbing member 3d. The diffused-light absorbing member 3d is a black member having been subjected to surface treatment, and has a three-dimensional complex fine structure on its surface, e.g., unevenness having a pitch and a height agreeing with the wavelengths of light. The diffused-light absorbing member 3d makes light L incident on the surface repeatedly reflected by this fine structure to trap the light, thereby absorbing it (stray-light effect). The surface treatment is performed by a method such as vapor deposition, plating, baking of inorganic coating, and electrostatic flocking.

The printed circuit board 6 (an example of a circuit board) is put on the case 5 and fixed to it. As shown in FIG. 1A, the LED dies 4 are mounted at a position on the lower surface of the printed circuit board 6 corresponding to the center of the rotating shaft 2. The position transducer 100 includes two LED dies 4a and 4b, which will be collectively referred to as LED dies 4. However, the number of LED dies 4 may be one or three or more. Each LED die 4 is a diffused light source that emits, from a single point, light spreading to a predetermined extent, and is mounted on the printed circuit board 6 so as to face the reflector 7. FIGS. 1A and 1B show light radiating from the LED dies 4 with arrows. In the position transducer 100, for example, aluminum gallium arsenide (AlGaAs) with a peak wavelength of 870 nm is used as the LED dies 4.

On the printed circuit board 6 is mounted a connector 9 including a ten-pin terminal. The pins 9a (see FIG. 3) of the connector 9 are fixed, for example, by soldering to lands of a pattern (not shown) formed on the printed circuit board 6, and are electrically connected to terminals of the detector 11 and the LED dies 4. The terminals of the detector 11 are formed at corners of chips 111 to 114 (see FIG. 3) described below, and are electrically connected via wires to lands on the printed circuit board 6. The terminals of the LED dies 4 are also electrically connected via wires to lands on the printed circuit board 6. To the connector 9, a female (or male) connector (not shown) connected, for example, with a connection terminal of a signal processing circuit is electrically coupled.

Figure 3:
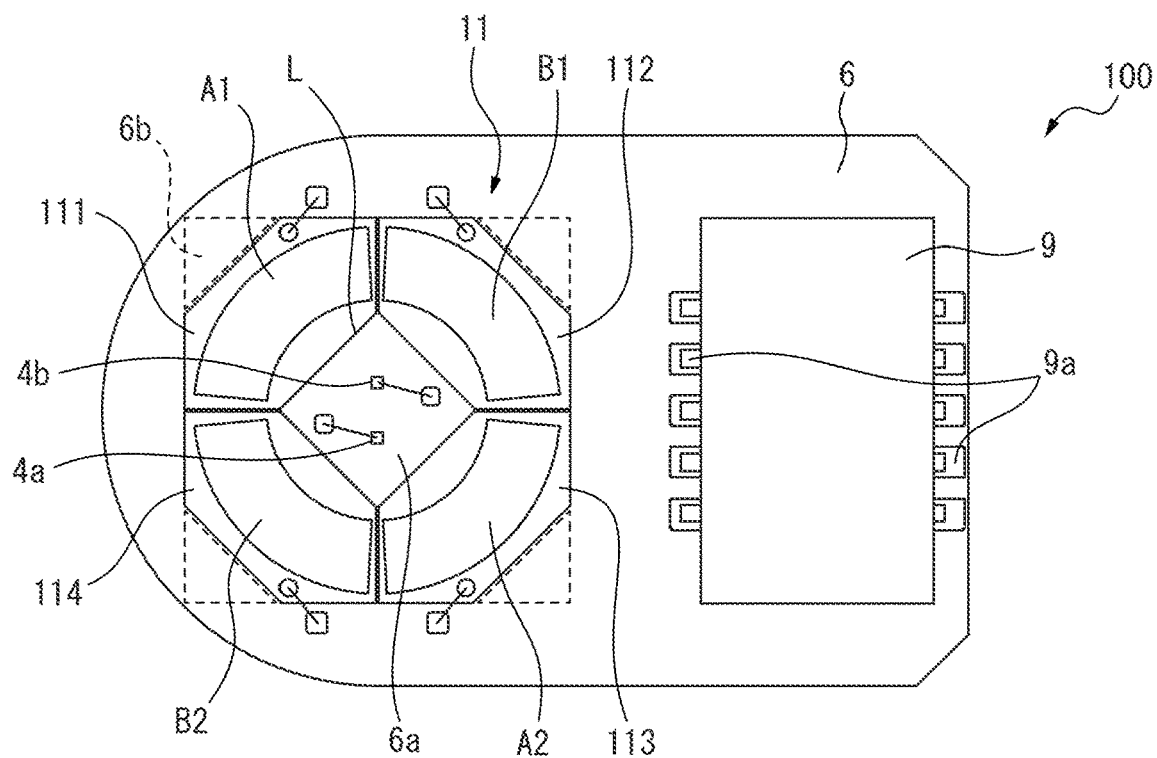
FIG. 3 is a plan view of a printed circuit board 6 of the position transducer 100 of an embodiment.
Figure 4:
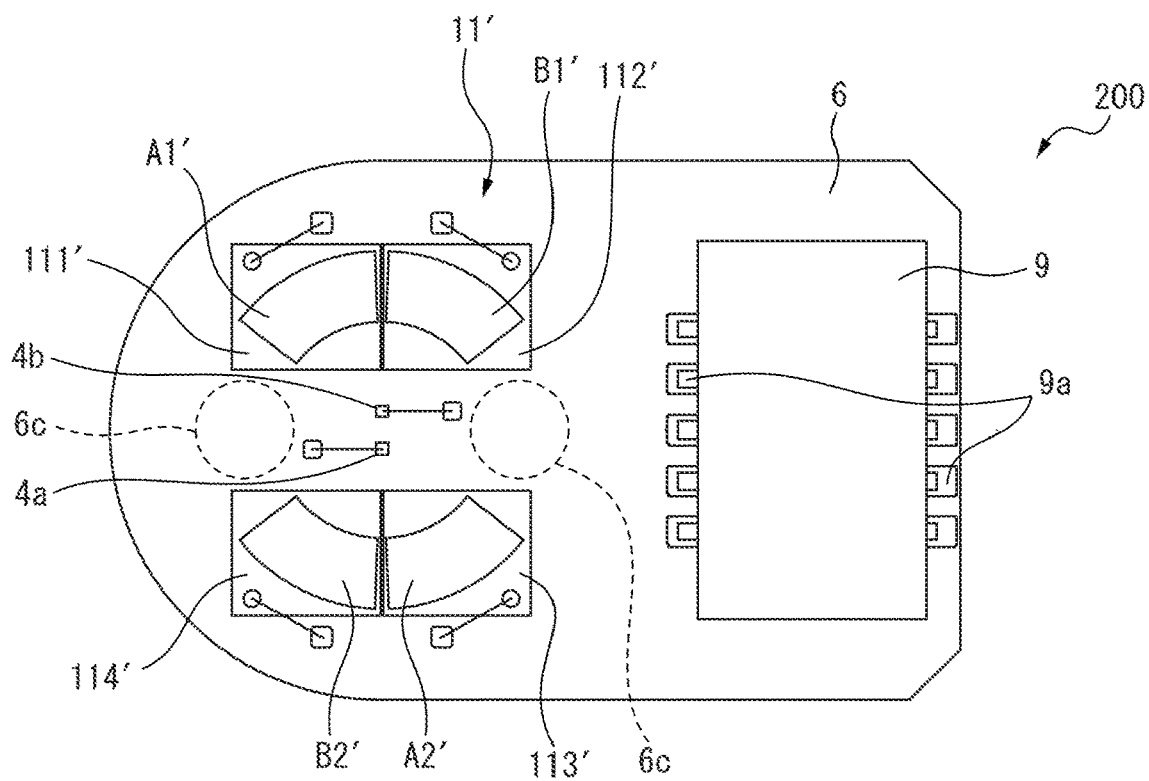
FIG. 4 is a plan view of a printed circuit board 6 of a position transducer 200 of a comparative example.
Figure 5:
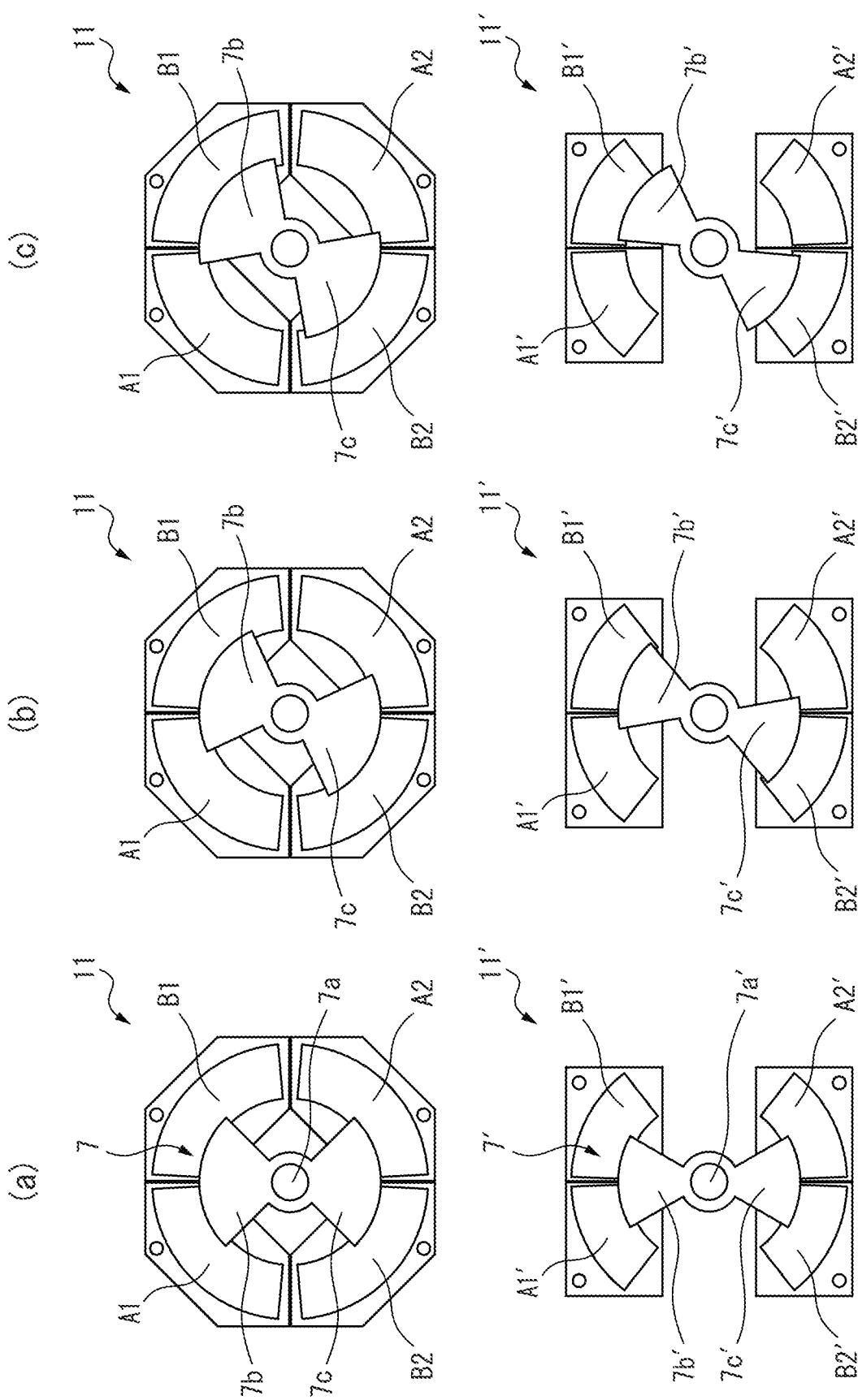
FIGS. 5(a) to 5(c) are plan views of detectors 11 and 11' and reflectors 7 and 7' of the position transducers 100 and 200.

FIG. 3 is a plan view of the printed circuit board 6 of the position transducer 100 of the embodiment. FIG. 4 is a plan view of a printed circuit board 6 of a position transducer 200 of a comparative example. FIGS. 5(a) to 5(c) are plan views of detectors 11 and 11' and reflectors 7 and 7' of the position transducers 100 and 200. The upper side of FIGS. 5(a) to 5(c) shows the detector 11 and the reflector 7 of the position transducer 100 whereas the lower side thereof shows a detector 11' and a reflector 7' of the position transducer 200. The position transducer 200 differs from the position transducer 100 only in that the reflector 7 and the detector 11 are replaced with the reflector 7' and the detector 11', respectively, and is otherwise identical in structure to the position transducer 100.

As shown in FIGS. 5(a) to 5(c), the reflector 7 has in the middle thereof a mounting hole 7a for being mounted on the reflector mounting portion 2a of the rotating shaft 2 by fitting, and has two butterfly-shaped flat reflective surfaces 7b and 7c projecting radially from the middle of the reflector 7. The reflector 7 has the reflective surfaces 7b and 7c, which are reflective regions, but does not have any nonreflective regions. Light emitted from the LED dies 4 and projected on the reflective surfaces 7b and 7c of the reflector 7 is reflected by the reflective surfaces 7b and 7c toward the detector 11. Since the diffused light absorber 3 is disposed behind the reflector 7 as seen from the LED dies 4, light emitted from the LED dies 4 and having passed through regions other than the reflective surfaces 7b and 7c toward the back side of the reflector 7 is absorbed by the diffused-light absorbing member 3d.

The reflector 7 is manufactured by forming a metal plate having been subjected to mirror finish, such as cold rolling, into a butterfly shape, for example, by etching or wire cutting. The reflectance of the reflector 7 may further be improved by vapor deposition of aluminum, silver, or gold on the reflective surfaces 7b and 7c to cover them with a metal coating.

The detector 11 is composed of four photodiode dies 111 to 114 shown in FIG. 3. The photodiode dies 111 to 114 are made of a silicon wafer having sensitivity to wavelengths between 800 and 900 nm, and include partially annular photosensitive regions A1, B1, A2, and B2, respectively. In the following, these photodiode dies and photosensitive regions will be referred to as "chips 111 to 114" and "photodiodes A1, B1, A2, and B2," respectively. The chips 111 to 114 are hexagons, and the photodiodes A1, B1, A2, and B2 each have a partially annular shape with a central angle of about 90 degrees. The photodiodes A1, B1, A2, and B2 are disposed on a circle centered at a position on the lower surface of the printed circuit board 6 immediately above the rotating shaft 2. The LED dies 4 and the chips 111 to 114 are mounted directly on the printed circuit board 6 without being packaged (chip-on-board).

The chips 111 to 114 are mounted so that the photodiodes A1 and A2 face each other with the LED dies 4 disposed therebetween in the middle and so do the photodiodes B1 and B2. Letting the adjacent photodiodes A1 and B1 be a pair and the photodiodes A2 and B2 another pair, the detector 11 includes two pairs of photodiodes. On the printed circuit board 6, the photodiodes A1 and A2 are connected in parallel and so are the photodiodes B1 and B2.

As shown in FIG. 4, the detector 11' of the position transducer 200 is composed of four chips 111' to 114', and includes four partially annular photodiodes A1', B1', A2', and B2'. The detector 11' differs from the detector 11 of the position transducer 100 only in the shape and arrangement of the chips and photodiodes. The chips 111' to 114' are rectangles, and the photodiodes A1', B1', A2', and B2' each have a partially annular shape with a central angle of about 60 degrees. In the detector 11', the chips 111' and 112' (the photodiodes A1' and B1' forming a pair) are in contact at one side, and so are the chips 113' and 114' (the photodiodes A2' and B2' forming another pair). There is space between the chips 111' and 112' and the chips 113' and 114', and LED dies 4 (4a and 4b) are mounted on this part of the printed circuit board 6.

The photodiodes of the detector 11' are also disposed on a circle centered at the LED dies 4, but do not surround the entirety of the LED dies 4 on the printed circuit board 6. The circle of the photodiodes breaks at two regions 6c on the left and right in FIG. 4 that face each other with the LED dies 4 therebetween. If the photodiodes were formed into partial annuli with central angles of about 90 degrees, disposing the photodiodes on the same circle would require bringing the four chips 111' to 114' into contact with each other, making it impossible to dispose the LED dies 4 on the printed circuit board 6.

As shown in FIG. 3, the chips 111 to 114 in the detector 11 of the position transducer 100 are each in contact with an adjacent chip at one side and have a hexagonal shape, producing a mounting region 6a of the LED dies 4 (a region where the surface of the printed circuit board 6 is exposed) at the center of the detector 11. Between adjacent two of the chips 111 to 114 in contact at one side are certain gaps whose widths are, for example, 0.5 mm or less but not limited thereto. The narrower these gaps, the larger the regions of the photodiodes can be made; but, when the outer dimensions vary among chips, it is preferable to leave gaps at least enough to accommodate these variations. However, the chips 111 to 114 may be each in contact with an adjacent chip at one side. In this case, to prevent the chips from making a short circuit, it is preferable to insulate the contact surfaces of the chips as necessary. In the detector 11, there is no section where the circle of the photodiodes breaks like the regions 6c in the detector 11', and the four photodiodes have an annular shape surrounding the entirety of the mounting region 6a of the LED dies 4 as a whole. However, there may be certain gaps between the photodiodes A1 and B2 and between the photodiodes B1 and A2 that do not form a pair. The narrower the gaps between the photodiodes A1 and B2 and between the photodiodes B1 and A2 that do not form a pair, the wider the range of operating angles. The narrower the gaps between the photodiodes A1 and B1 and between the photodiodes B2 and A2 forming a pair, the better the signal-to-noise ratio.

In the detector 11, the number of photodiodes is four, and the photodiodes A1, B1, A2, and B2 and the chips 111 to 114 are disposed on the printed circuit board 6 with 360/4 degree (=90 degree) rotational symmetry. The chips 111 to 114 are congruent hexagons, and the detector 11 has a substantially regular octagonal outline as a whole. However, as long as the photodiodes are disposed in an annulus as a whole, the chips need not have exactly the same shape and size, and the outline of the detector 11 need not be a regular polygon.

Since the chips are hexagonal in shape, the outer edges of the chips do not hinder the printed circuit board 6 from being covered with the case 5, allowing for downsizing the position transducer 100. Since the outline of the detector 11 is octagonal, there is little dead space on the printed circuit board 6, facilitating layout of components on the printed circuit board 6. Unlike the illustrated example, the chips may be extended to four triangular regions 6b outside the detector 11 shown in FIG. 3 so that the chips may be congruent pentagons and the outline of the detector 11 a square or a rectangle. Alternatively, each chip may be formed into a trapezoid (i.e., a tetragon) whose upper base is a side L on the mounting region 6a shown in FIG. 3. The shape of each chip may be a polygon that is not tetragonal, pentagonal, nor hexagonal, but is preferably a pentagon or a hexagon from the standpoint of downsizing the chips and providing a large region for their terminals to be formed in, and is preferably a hexagon particularly from the standpoint of downsizing the chips.

A butterfly-shaped image projected on the photodiodes A1, B1, A2, and B2, which is made by light emitted from the LED dies 4 and reflected by the reflector 7, moves together with rotation of the limited rotation motor 1. The detector 11 receives the image of light reflected by the rotating reflective surfaces 7b and 7c to output a signal varying depending on the ratio between the areas of the received image on two photodiodes forming a pair. More specifically, the photodiodes A1 and A2 and the photodiodes B1 and B2 receive the image to output photocurrents Ia and Ib depending on the respective areas of the received image. The photocurrents Ia and Ib are subjected to current-to-voltage conversion into voltages Va and Vb, respectively, by a signal processing circuit 13 in FIG. 6 described below. The difference Va−Vb in voltage is output of the position transducer 100.

For example, in the case of FIG. 5(a), since the area of the received image on the photodiodes A1 and A2 is equal to that on the photodiodes B1 and B2, the output voltage of the position transducer 100 is Va−Vb=0. Let the position of the reflector 7 at this time be a reference position and its rotation angle 0 degrees. In the cases of FIGS. 5(b) and 5(c), since the area of the received image on the photodiodes B1 and B2 is larger than that on the photodiodes A1 and A2, the output voltage of the position transducer 100 is Va−Vb<0. When the reflector 7 rotates opposite to that in FIGS. 5(b) and 5(c), the output voltage of the position transducer 100 will be Va−Vb>0. The same holds true for the position transducer 200.

As shown in FIGS. 5(a) to 5(c), the reflector 7' of the position transducer 200 has a mounting hole 7a' and reflective surfaces 7b' and 7c' similar to those of the reflector 7. The reflective surfaces 7b and 7c of the reflector 7 are wider than the reflective surfaces 7b' and 7c' of the reflector 7', since the photodiodes of the detector 11 have longer arcs than those of the detector 11'. In order for the position transducer to operate, the reflective surfaces of the reflector need to simultaneously overlap both the photodiodes A1 and B1 and both the photodiodes A2 and B2 forming a pair. However, if the reflective surfaces simultaneously overlap both the photodiodes B1 and A2 and both the photodiodes A1 and B2 that do not form a pair, correct output will not be obtained. For this reason, the width of the reflective surfaces 7b and 7c is set so that each of them will not overlap two photodiodes that do not form a pair even when the reflector 7 rotates to the limit of the range of operating angles.

The rotation angles of the reflectors 7 and 7' are equal in each of FIGS. 5(a) to 5(c). Letting the clockwise direction in these figures be a forward direction, the rotation angle in FIG. 5(c) is greater than that in FIG. 5(b). In the case of the position transducer 200 in FIG. 5(c), neither the reflective surface 7b' nor 7c' overlaps two photodiodes forming a pair, and further the edges of the reflective surfaces 7b' and 7c' on the side of the rotating direction do not overlap the photodiodes B1' and B2', respectively. Hence the reflector 7' cannot rotate to the angle shown in FIG. 5(c), and the angle shown in FIG. 5(b) is the upper limit of the range of operating angles of the reflector 7'. However, in the case of the position transducer 100, at the angle shown in FIG. 5(c), the reflective surfaces 7b and 7c overlap barely both the photodiodes A1 and B1 and both the photodiodes A2 and B2 forming a pair, and further the edges of the reflective surfaces 7b and 7c on the side of the rotating direction barely overlap the photodiodes B1 and B2, respectively. Hence this angle is the upper limit of the range of operating angles of the reflector 7. Therefore the range of operating angles of the position transducer 100 is wider than that of the position transducer 200.

In the position transducer 100, the hexagonal chips 111 to 114 are brought into contact with each other to form the photodiodes A1, B1, A2, and B2 into an annular shape as a whole, allowing for providing the mounting region of the LED dies 4 on the printed circuit board 6 and widening the range of operating angles.

If the photodiodes were formed on a single wafer as in the position transducer system of Patent Document 1, the LED dies would need to be mounted on the same wafer, and thus light from the LED dies would be directly incident on the photodiodes, which would decrease the signal-to-noise ratio of output and cause a dark current, resulting in individual variations in characteristics. In this case, it would be technically difficult to form an opening at the center of the wafer of the detector so that the LED dies could be mounted on the printed circuit board, and it would increase processing cost if it could be achieved.

In the position transducer 100, the photodiodes A1, B1, A2, and B2 are formed on the separate chips 111 to 114. Such division of the chips of the photodiodes allows for providing the mounting region of the LED dies 4 on the printed circuit board 6 as described above, and thereby lowers the mounting position of the LED dies 4 relative to the upper surfaces of the chips by the thickness of the chips (it is assumed that the lower side of FIGS. 1A and 1B is the top). This improves the signal-to-noise ratio because light from the LED dies is less likely to enter the photodiodes directly than would be the case if the photodiodes were formed on a single wafer.

Figure 6:
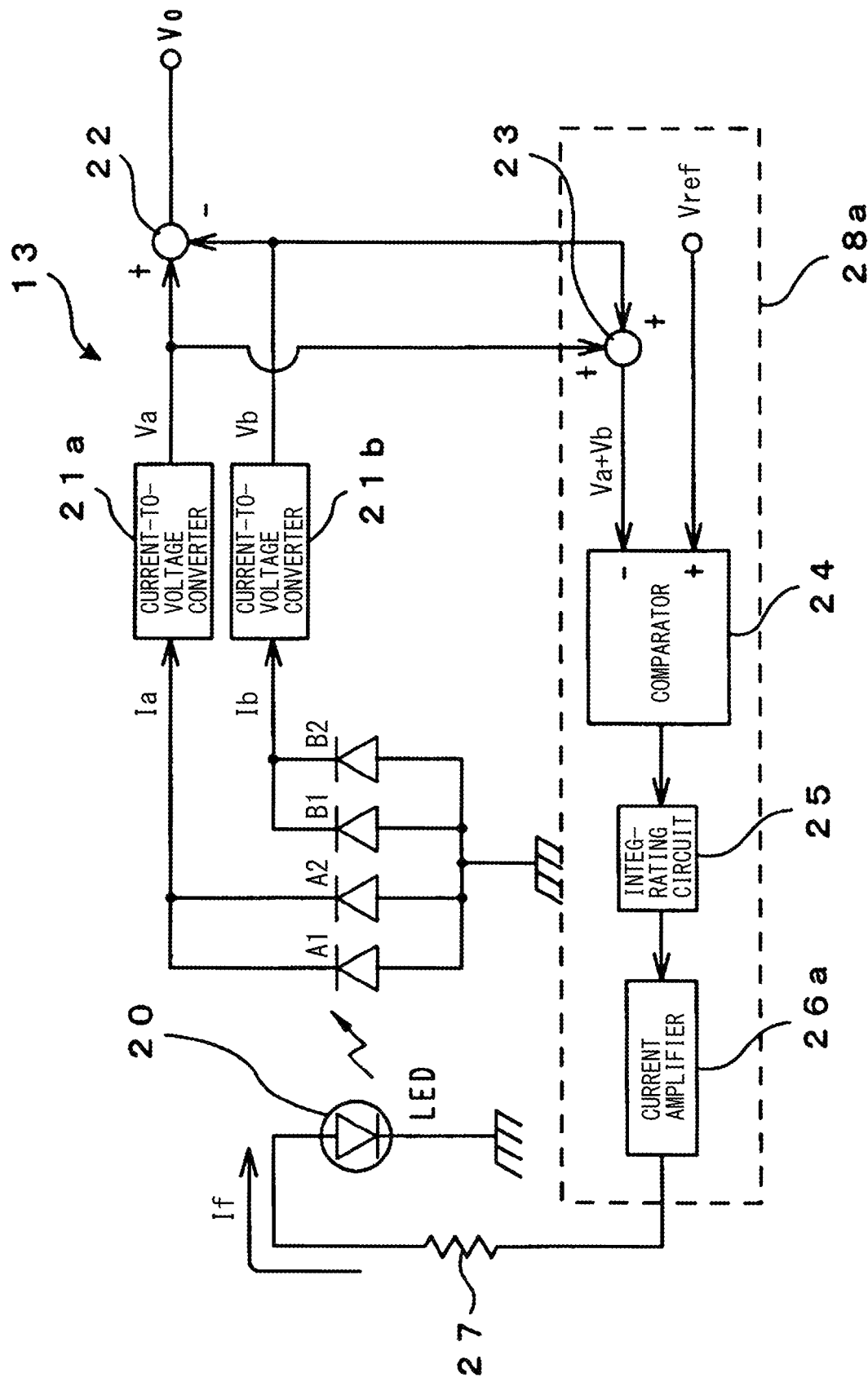
FIG. 6 is a circuit diagram of a signal processing circuit 13 of the position transducer 100.

FIG. 6 is a circuit diagram of a signal processing circuit 13 of the position transducer 100. Although not shown in FIGS. 1A to 1C, the position transducer 100 includes a signal processing circuit 13 that converts the photocurrents of the photodiodes A1, B1, A2, and B2 depending on the rotation angle of the limited rotation motor 1 to a voltage signal.

The photocurrent Ia, which is output of the photodiodes A1 and A2, is inputted into a current-to-voltage converter 21a. The photocurrent Ib, which is output of the photodiodes B1 and B2, is inputted into a current-to-voltage converter 21b. Output voltages Va and Vb of the current-to-voltage converters 21a and 21b are inputted into a subtractor 22 and subjected to a subtraction process. Output Vo of the position transducer processed by the signal processing circuit 13 is $$Vo=(Ia-Ib)Vref/(Ia+Ib)$$

where Vref is a reference voltage.

To obtain highly accurate output of position transduction, the signal processing circuit 13 includes an AGC circuit 28a that performs linear compensation and temperature compensation for temperature change that the optical system cannot compensate for. The output voltages Va and Vb of the current-to-voltage converters 21a and 21b are lead to the AGC circuit 28a and added by an adder 23. The output of this addition is compared by a comparator 24 with the reference voltage Vref. The output of the comparator 24 is subjected to an integration process by an integrating circuit 25, and amplified by a current amplifier 26a. In this way, a current If is supplied to LEDs 20 (the LED dies 4) via a resistor 27.

Figure 7:
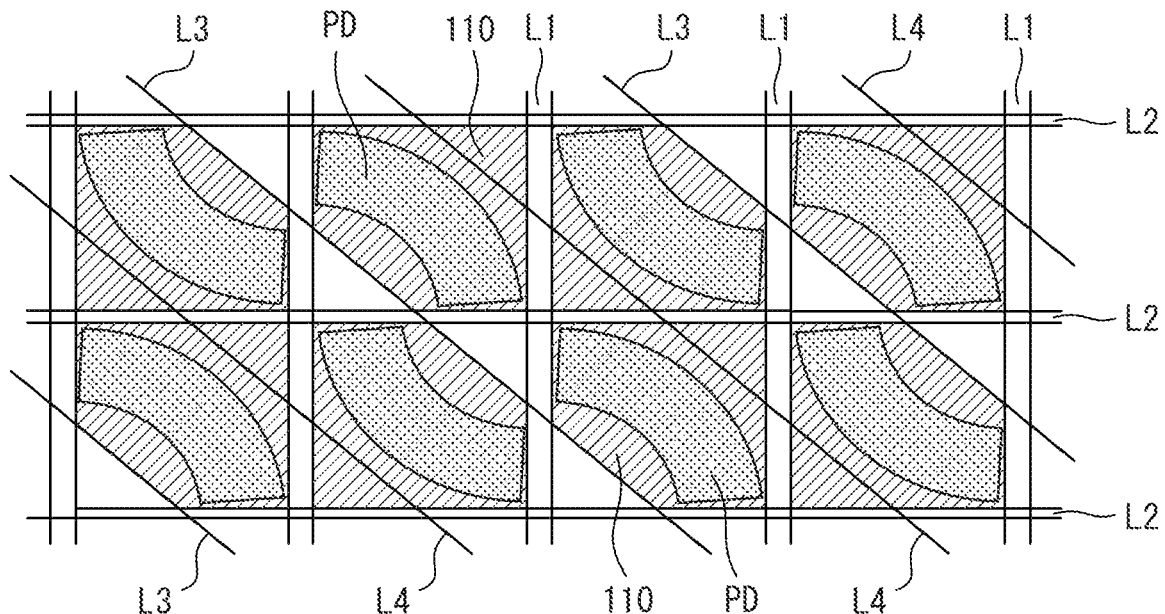
FIGS. 7(a) and 7(b) are diagrams for explaining methods for manufacturing the detectors 11 and 11'.
Figure 7:
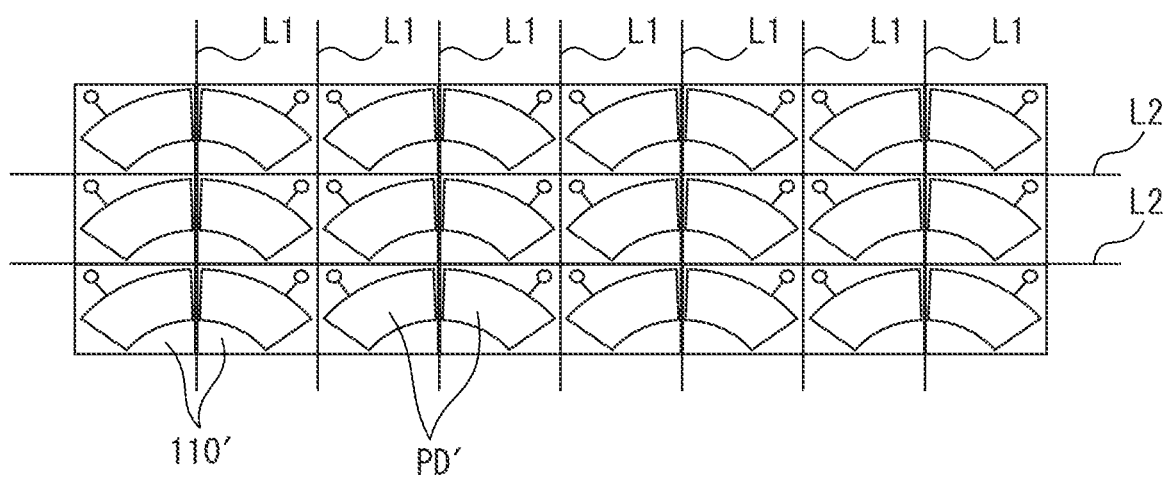

FIGS. 7(a) and 7(b) are diagrams for explaining methods for manufacturing the detectors 11 and 11', respectively. To manufacture the detector 11 of the position transducer 100, partially annular photodiodes PD are first formed, for example, on a single silicon wafer in a grid-like pattern so that adjacent photodiodes face in 180 degree opposite directions, as shown in FIG. 7(a). These partial annuli have central angles of about 90 degrees, and the photodiodes are formed so that partial annuli having centers at the upper right in FIG. 7(a) and partial annuli having centers at the lower left are disposed on the silicon wafer alternately in both the longitudinal and latitudinal directions. To form partially annular photosensitive regions, for example, fan-shaped non-deposited regions are made on the surface of the silicon wafer by vapor deposition of aluminum so that portions unnecessary as the detector may be shielded from light.

Next, the silicon wafer is cut longitudinally, latitudinally, and obliquely along straight lines L1 to L3 shown in FIG. 7(a) (dicing) to form pentagonal chips 110. In particular, oblique cutting along the straight lines L3 forms sides L (see FIG. 3) that will face the mounting region 6a of the LED dies 4 when the chips are mounted on the printed circuit board 6. If pentagonal chips are used for the detector 11, cutting three times along the straight lines L1 to L3 suffices. However, if hexagonal chips are used, the silicon wafer is further obliquely cut along straight lines L4 shown in FIG. 7(a). Then, the diced chips 110 are mounted on the printed circuit board 6 so that the partially annular photodiodes PD have an annular shape as a whole. The detector 11 shown in FIG. 3 is thus completed.

To manufacture chips 110' for the detector 11' of the position transducer 200, partially annular photodiodes PD' are formed on a single silicon wafer in a grid-like pattern so that all the photodiodes are arrayed in the same orientation, as shown in FIG. 7(b), and then the wafer is cut longitudinally and latitudinally along straight lines L1 and L2. This array minimizes waste of the wafer; however, if all the photodiodes PD are arrayed in the same orientation as in FIG. 7(b) at the manufacture of the chips 110 for the detector 11, obliquely cutting of each chip will be necessary in order to form the sides L of the chips that will face the mounting region 6a. If the photodiodes are arrayed on a silicon wafer so that adjacent photodiodes face in 180 degree opposite directions as shown in FIG. 7(a), the sides L of multiple chips can be formed by cutting once along the straight lines L3, reducing the number of times of cutting necessary to form the same number of chips as compared to the case of the arrangement in FIG. 7(b).

The smaller the number of times of cutting the wafer, the lower the manufacturing cost; and thus the arrangement shown in FIG. 7(a) allows for reducing the manufacturing cost of the detector 11. The method for cutting the wafer is not limited to dicing with a blade and may be dicing with laser. The cutting lines of the wafer are not limited to straight lines and may be curves, and thus the chips of the detector 11 need not be polygons. However, it is preferable that the chips be polygons from the standpoint of reducing the manufacturing cost because non-polygonal chips will increase the manufacturing cost.

The present invention is not limited to the illustrated example. For example, the reflector may include a single semicircular reflective surface, and the detector may be composed of two photodiodes. However, if this configuration is employed, eccentricity of the reflective surface will not be corrected, and each chip will have a complex shape to provide the mounting region of the LED dies inside the region surrounded by the two photodiodes. Thus it is preferable that the number of reflective surfaces be two and that of photodiodes be four, as in the position transducer 100.

The LED dies and the diodes may be fixed onto a substrate that does not have any conductive pattern formed thereon, instead of being mounted on the printed circuit board. The light source is not limited to an LED and may be another type of light-emitting device. The light source is not limited to a diffused light source and may be a parallel light source that emits substantially undiffused parallel light.

The present invention is not limited to a reflection-type optical position transducer, which reflects part of light emitted from a light source with a reflector and receives the reflected light with photodiodes, and may be a transmission-type optical position transducer, which blocks part of light emitted from a light source with a blocker (light absorbing member) and receives the transmitted light with photodiodes. For example, if the reflection-type optical position transducer 100 is configured as a transmission-type optical position transducer, the reflector 7 will be replaced with a blocker, the chips 111 to 114 will be mounted on a second printed circuit board different from the printed circuit board 6, and the second printed circuit board will be disposed around the rotating shaft 2 so as to face the printed circuit board 6 with the blocker therebetween. The second printed circuit board has an opening pierced by the rotating shaft 2, and the chips 111 to 114 are mounted on the second printed circuit board so that the photodiodes A1, B1, A2, and B2 surround the entirety of the region where the opening is formed and have an annular shape as a whole.

According to the results of verification performed by the present applicant, the range of operating angles of the position transducer 200 of the comparative example shown in FIG. 4 was approximately ±20 degrees at the maximum, whereas that of the position transducer 100 of the embodiment shown in FIG. 3 was approximately ±40 degrees at the maximum. Hence it has been confirmed that the present invention remarkably widens the range of operating angles. Additionally, according to the results of verification performed by the applicant, nonlinearity of a limited rotation motor (the percentage of an angular error), which is generally expressed by an expression "$100 \times (|\Delta\theta_1| + |\Delta\theta_2|)/\theta$"

($\Delta\theta_1$ is an angular error in a forward direction of rotation, $\Delta\theta_2$ is an angular error in a backward direction of rotation, and e is the range of operating angles), with the position transducer 200 of the comparative example shown in FIG. 4 was approximately 1.1% when the operating angle was ±20 degrees. In contrast, nonlinearity of a limited rotation motor with the position transducer 100 of the embodiment shown in FIG. 3 was approximately 0.1% when the operating angle was ±20 degrees. Hence it has been confirmed that the present invention remarkably decreases nonlinearity (remarkably improves linearity) of a limited rotation motor. In other words, the present invention has an excellent effect as compared to a conventional position transducer like that of the comparative example.

The invention claimed is:

1. A position transducer comprising:
   a light source; and
   a detector including at least one pair of photodiodes disposed on a predetermined circle, the detector receiving light emitted from the light source to output a signal varying depending on the areas of regions where the light is received on two photodiodes forming a pair, wherein
   the photodiodes are formed on separate chips, respectively, and
   the chips are disposed on a substrate so that one or more pairs of photodiodes surround the entirety of a predetermined region and have an annular shape as a whole, the chips are pentagons, respectively, or the chips are hexagons, respectively.

2. The position transducer according to claim 1, wherein the photodiodes and the chips are disposed on the substrate with 360/n degree rotational symmetry, wherein n represents the number of photodiodes.

3. The position transducer according to claim 1, wherein when the chips are pentagons, respectively, the chips are disposed so as to have a tetragonal outline as a whole.

4. The position transducer according to claim 1, wherein when the chips are hexagons, respectively, the chips are disposed so as to have an octagonal outline as a whole.

5. A method for manufacturing a position transducer including a light source, and detector including at least one pair of photodiodes disposed on a predetermined circle, the detector receiving light emitted from the light source to output a signal varying depending on the areas of regions where the light is received on two photodiodes forming a pair, wherein the photodiodes are formed on separate chips, respectively, and the chips are disposed on a substrate so that one or more pairs of photodiodes surround the entirety of a predetermined region and have an annular shape as a whole, the method comprising the steps of:

forming partially annular photodiodes on a common wafer in a grid-like pattern so that adjacent photodiodes face in 180 degree opposite directions;

forming chips by cutting the wafer longitudinally, latitudinally, and obliquely; and disposing the chips on a substrate so that the photodiodes have an annular shape as a whole.

6. The method according to claim 5, wherein the chips are polygons, and the polygonal chips are formed in the step of forming chips by cutting the wafer longitudinally, latitudinally, and obliquely.

7. The method according to claim 6, wherein the chips are pentagons, and the pentagonal chips are formed in the step of forming chips by cutting the wafer longitudinally, latitudinally, and obliquely.

8. The method according to claim 6, wherein the chips are hexagons, and the hexagonal chips are formed in the step of forming chips by cutting the wafer longitudinally, latitudinally, and obliquely.

* * * * *